(12) United States Patent
Spindler et al.

(10) Patent No.: US 8,862,392 B2
(45) Date of Patent: Oct. 14, 2014

(54) DIGITAL MAP LANDMARKING SYSTEM

(75) Inventors: Carsten-Christian Spindler, Karlsruhe (DE); Vladimir Ivanov, München (DE); Martin Fischer, München (DE); Simon Schütz, Stuttgart (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 59 days.

(21) Appl. No.: 13/426,376

(22) Filed: Mar. 21, 2012

(65) Prior Publication Data

US 2012/0245842 A1    Sep. 27, 2012

(30) Foreign Application Priority Data

Mar. 22, 2011  (EP) .................................. 11002356

(51) Int. Cl.
*G01C 21/00* (2006.01)
*G01C 21/36* (2006.01)

(52) U.S. Cl.
CPC .................................. *G01C 21/3638* (2013.01)
USPC ............................ 701/438; 364/436; 364/460

(58) Field of Classification Search
CPC ........... G01C 21/3632; G01C 21/3635; G01C 21/367; G01C 21/3673; G01C 21/3638; G01C 21/3644; G01C 21/3679; G01C 21/3682
USPC ............ 701/436, 438, 454–457, 460; 353/11, 353/12
See application file for complete search history.

(56) References Cited

U.S. PATENT DOCUMENTS

| | | |
|---|---|---|
| 5,684,940 A | 11/1997 | Freeman et al. |
| 6,360,168 B1 | 3/2002 | Shimabara .................... 701/211 |
| 6,565,610 B1 | 5/2003 | Wang et al. .................... 715/517 |
| 6,710,774 B1 | 3/2004 | Kawasaki |
| 6,718,304 B1 | 4/2004 | Tachimori et al. |
| 7,084,882 B1 | 8/2006 | Dorum et al. |
| 7,557,736 B1 | 7/2009 | Daily et al. |
| 7,665,040 B2 | 2/2010 | Nakamura |
| 7,765,055 B2 | 7/2010 | Cera et al. |
| 7,933,395 B1 | 4/2011 | Bailly et al. |
| 8,260,545 B1 | 9/2012 | Aspen et al. |
| 2004/0083108 A1 | 4/2004 | Tachimori et al. |
| 2005/0052413 A1 | 3/2005 | Ueno ............................ 345/158 |
| 2005/0182605 A1 | 8/2005 | Agrawala et al. |
| 2006/0152503 A1 | 7/2006 | Lee et al. ....................... 345/419 |

(Continued)

FOREIGN PATENT DOCUMENTS

| | | | | |
|---|---|---|---|---|
| DE | 10 2006 059 922 A1 | 6/2008 | ............. | G01C 21/36 |
| DE | 102008036748 A1 | 10/2009 | ............. | G01C 21/34 |

(Continued)

OTHER PUBLICATIONS

Machine translation of DE 10 2006 059 922 A1, Jun. 26, 2008.*

(Continued)

*Primary Examiner* — Mary Cheung
(74) *Attorney, Agent, or Firm* — Patterson & Sheridan, LLP (57) ABSTRACT

A navigation system includes a display for displaying at least a part of a digital map. A landmark detected within the digital map is displayed as a three-dimensional graphical object or a two-dimensional graphical object depending on a location of the landmark.

21 Claims, 5 Drawing Sheets

(56) References Cited

U.S. PATENT DOCUMENTS

| | | | |
|---|---|---|---|
| 2007/0021911 A1 | 1/2007 | Kikuchi et al. | 701/211 |
| 2007/0192020 A1 | 8/2007 | Brulle-Drews et al. | 701/200 |
| 2007/0229513 A1 | 10/2007 | Bowman | 345/467 |
| 2008/0021644 A1 | 1/2008 | Meyer | 701/211 |
| 2008/0036787 A1 | 2/2008 | Gelber | |
| 2008/0198162 A1 | 8/2008 | Ni | 345/442 |
| 2008/0208450 A1 | 8/2008 | Katzer | 701/201 |
| 2008/0298162 A1 | 12/2008 | Passoni | 366/111 |
| 2010/0085350 A1 | 4/2010 | Mishra et al. | 345/419 |
| 2010/0280747 A1 | 11/2010 | Achthoven | 701/200 |
| 2012/0245841 A1 | 9/2012 | Spindler et al. | |

FOREIGN PATENT DOCUMENTS

| | | | | |
|---|---|---|---|---|
| EP | 0652418 A1 | 5/1995 | | G01C 21/20 |
| EP | 0829823 A2 | 3/1998 | | G06T 17/50 |
| EP | 0940795 A2 | 9/1999 | | G08G 1/969 |
| EP | 1 024 467 A2 | 8/2000 | | G08G 1/0969 |
| EP | 1 189 176 A2 | 3/2002 | | G06T 17/50 |
| EP | 1241445 A2 | 9/2002 | | G01C 21/34 |
| EP | 1710713 A1 | 10/2006 | | G01C 17/21 |
| EP | 1 746 391 A1 | 1/2007 | | G01C 21/36 |
| EP | 2273337 A2 | 1/2011 | | G05D 1/02 |
| JP | 08194432 A | 7/1996 | | G09B 29/00 |
| JP | 10-089990 | 4/1998 | | |
| JP | 2000029450 A | 1/2000 | | G09G 5/24 |
| JP | 2007085863 A | 4/2007 | | G01C 21/00 |
| WO | WO 2008/074561 A1 | 6/2008 | | G01C 21/36 |

OTHER PUBLICATIONS

Extended European Search Report, issued in European Patent Application No. 11 002 356.1, dated Sep. 15, 2011 (8 pgs.).

Office Action, dated Oct. 25, 2012, pp. 1-15, U.S. Appl. No. 13/426,304, U.S. Patent and Trademark Office, Virginia.

Office Action, dated Nov. 14, 2012, pp. 1-25, U.S. Appl. No. 13/426,360, U.S. Patent and Trademark Office, Virginia.

Office Action, dated Mar. 7, 2013, pp. 1-20, U.S. Appl. No. 13/426,304, U.S. Patent and Trademark Office, Virginia.

European Office Action, EP 11 002 359.5, dated May 22, 2013, 3 pgs.

Office Action, dated Aug. 2, 2013, pp. 1-8, U.S. Appl. No. 13/426,304, U.S. Patent and Trademark Office, Virginia.

European Search Report dated Jun. 25, 2013, pp. 1-3, European Patent Application No. 11 002 357.9, European Patent Office, Rijswijk, Netherlands.

European Search Report dated Jun. 25, 2013, pp. 1-7, European Patent Application No. 11 002 356.1, European Patent Office, Rijswijk, Netherlands.

Office Action, dated Aug. 26, 2013, pp. 1-17, U.S. Appl. No. 13/426,228, U.S. Patent and Trademark Office, Virginia.

* cited by examiner

DIGITAL MAP LANDMARKING SYSTEM

BACKGROUND OF THE INVENTION

1. Priority Claim

This application claims the benefit of priority from European Patent Application No. 11 002 356.1, filed Mar. 22, 2011, which is incorporated by reference.

2. Technical Field

The invention relates to digital maps representing towns and landscapes that are used for route guidance by a navigation system and, in particular, it relates to the managing and representation of landmarks in digital maps.

3. Related Art

The use of navigation systems in vehicles is becoming increasingly prevalent. Typically, on-board navigation computer systems analyze the combined data provided by GPS (global positioning system), motion sensors such as ABS (anti-lock braking system) wheel sensors, and a digital map to determine the actual position and velocity of a vehicle with increasing preciseness.

Known navigation systems typically use electronic digital maps to represent cartographic features, such as streets, buildings and rivers, and store the data that relates to the cartographic features on a compact disk or a digital video disc. After performing a map matching algorithm, the actual position of the user may be indicated in the digital map. By acoustic and/or visual information, the user may be guided to a predetermined destination.

Some navigation systems are able to display detailed digital maps indicating routes to destinations, the types of maneuvers to be taken at various locations such as intersections as well as different kinds of points of interest (e.g., gas stations, restaurants and landmarks). As the vehicle changes position, either the vehicle position mark on the displayed image changes or the digital map may be scrolled while the vehicle position mark is fixed at a predetermined position.

More elaborated navigation systems provide enlarged views, for example, of intersections on the guide route where the driver should turn in order to help the driver to identify the route to be taken to the predetermined destination more accurately. The to displayed images represent simplified synthesized views from the driver's perspective. However, a two-dimensional representation can confuse the driver, in particular, if roads are intersecting at different height levels or in rotary turns with roads in close proximity. Summary A navigation system of a vehicle stores a two-dimensional representation of a landmark and three-dimensional representation of the same landmark. The landmark may be a heritage site, prominent building, historical monument, natural monument, or any other physical object which may provide the driver of the vehicle with quickly recognizable information and allow for reliable spatial orientation which may be useful to the driver. The navigation system provides either the two-dimensional or three-dimensional representation of the landmark in a digital map based on the calculated distance of the landmark from the current position of the navigation system.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Navigating in unfamiliar road environments is a common and demanding task that drivers are sometimes forced to undertake. The resulting navigational uncertainty may manifest itself in a number of ways. For example, the uncertainty may lead to stress and frustration for the driver, the driver's relationship with other road users (e.g., misleading use of signals, sudden braking), or the traffic system as a whole (e.g., poor route choices, missed turns). The use of prominent features of the environment (e.g., landmarks) is essential for optimal human navigation. As used herein, the terms 'road' and 'street' are used in an interchangeable manner.

A navigation system of a vehicle may determine the location of the vehicle and display at least part of a digital map representing a surrounding area of the determined vehicle location. The navigation system may either display a two-dimensional or three-dimensional graphical representation of a landmark within the displayed area depending on a location of the landmark with respect to the determined location of the vehicle. The landmark may be a heritage site, prominent building such as a cathedral, historical monument, natural monument, or any other physical object which may help the driver of the vehicle orientate himself or herself when faced with a complex road topology. Landmarks are consistent with basic human navigational strategies because they are typically the most well-known features of an environment and can act as powerful navigation cues. However, graphical representations of landmarks are expensive in terms of computational resources and, thus, it is particularly advantageous to graphically represent landmarks by only two-dimensional graphical when they are hardly visible or not visible by the driver in the actual physical environment. Hereinafter, the term "icon" will interchangeably be used for the term "two-dimensional graphical object".

In order to provide navigation function, a navigation system may make use of one or more detailed databases that comprise data which represent physical features of a geographic region. For example, the database may include bitmap images and/or vector graphics of the road geometry, signposts, landmarks, the skyline, and the like. Landmarks may include heritage sites, prominent buildings, historical monuments, natural monuments, and any other physical object which may provide the user of a navigation system with quickly recognizable information on the actual topology and allow for quick, reliable spatial orientation which may be useful for the driver.

Operation of a navigation system usually entails efficient use of available computing resources such as storage capacity and the memory and performance of a computer central processor unit (CPU) in an embedded system. If, for example, it takes the navigation system more than a few seconds to calculate the recommended route and/or to display the forward path and surrounding area properly, the driver may have moved beyond a point at which information provided by the navigation system is relevant as is, in particular, the case at intersections. Particularly, the appropriate and detailed display of landmarks proves a challenging demand for the computational resources of navigation systems.

The navigation system may determine whether a landmark will be represented in the digital map (displayed in the map) by an icon or a three-dimensional object. The digital map may be a two-dimensional map or a three-dimensional one. The decision may be made on the basis of the location of the landmark relative to the current location of the navigation system. Typically, digital maps displayed for route guidance are centered on a location of the vehicle in the digital map. If an actual landmark for which both a three-dimensional graphical object and an icon representation are available in a database of the navigation system, the navigation system may determine whether the landmark is within a predetermined distance from the location of the vehicle. If it is determined that the landmark lies within a predetermined distance threshold, the three-dimensional graphical object may be displayed in the digital map to represent the landmark. If, on the other hand, the landmark is not within the determined distance, the icon may be displayed in the digital map to represent the landmark.

A vehicle user can, for example, look-ahead a prescribed distance from his current location—for example a quarter mile. The user can keep this quarter mile setting active such that his or her navigation display will continually be updated with images that are a quarter mile ahead, the digital map updated based upon the changing location of the user's vehicle as it moves along a road, such as a freeway. For example, every time the user's vehicle moves ahead ten meters, a new image is displayed to the user, the image depicting a scene of the highway located a quarter mile ahead of the new location. In this way, as the user drives along the freeway, he or she can look down at the display and check what is happening on the freeway a quarter mile ahead. In one example, the user can manipulate the navigation system to change the look-ahead distance, adjusting it for example from a quarter mile to a half mile to a full mile if the user wants to see what is happening on the freeway even further ahead.

Figure 1A:
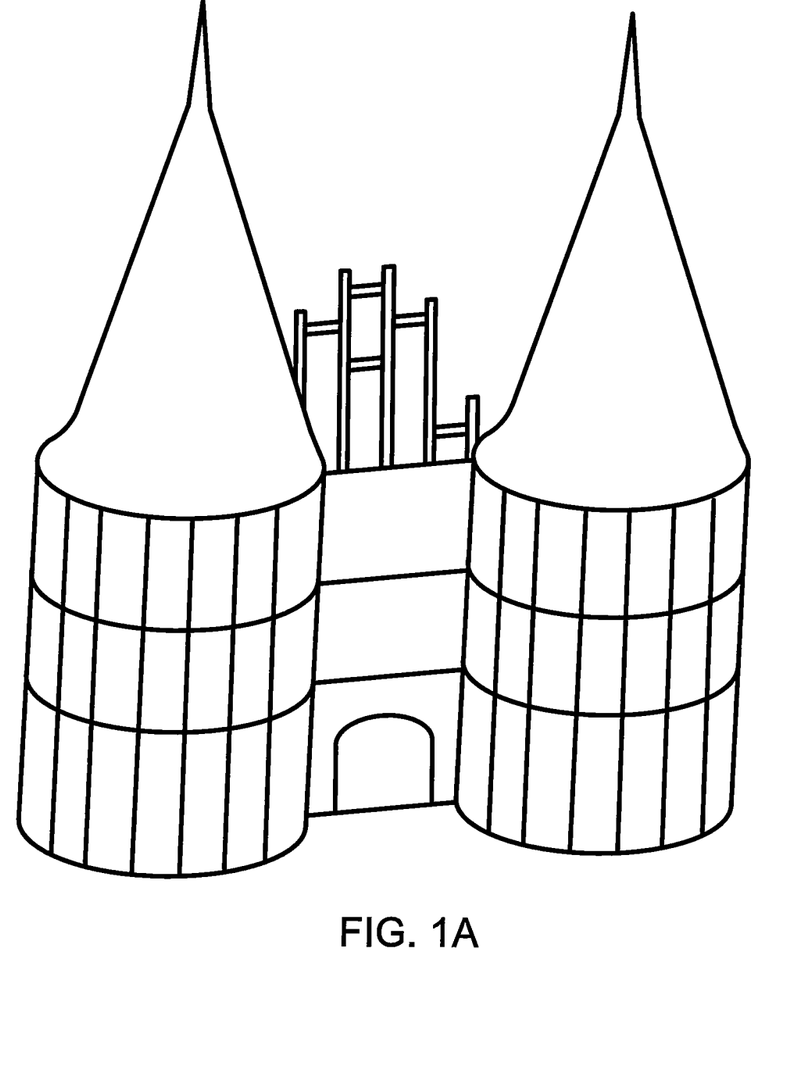
FIGS. 1A and 1B illustrate one example of a three-dimensional graphical object and icon, respectively, representing a landmark.
Figure 1B:
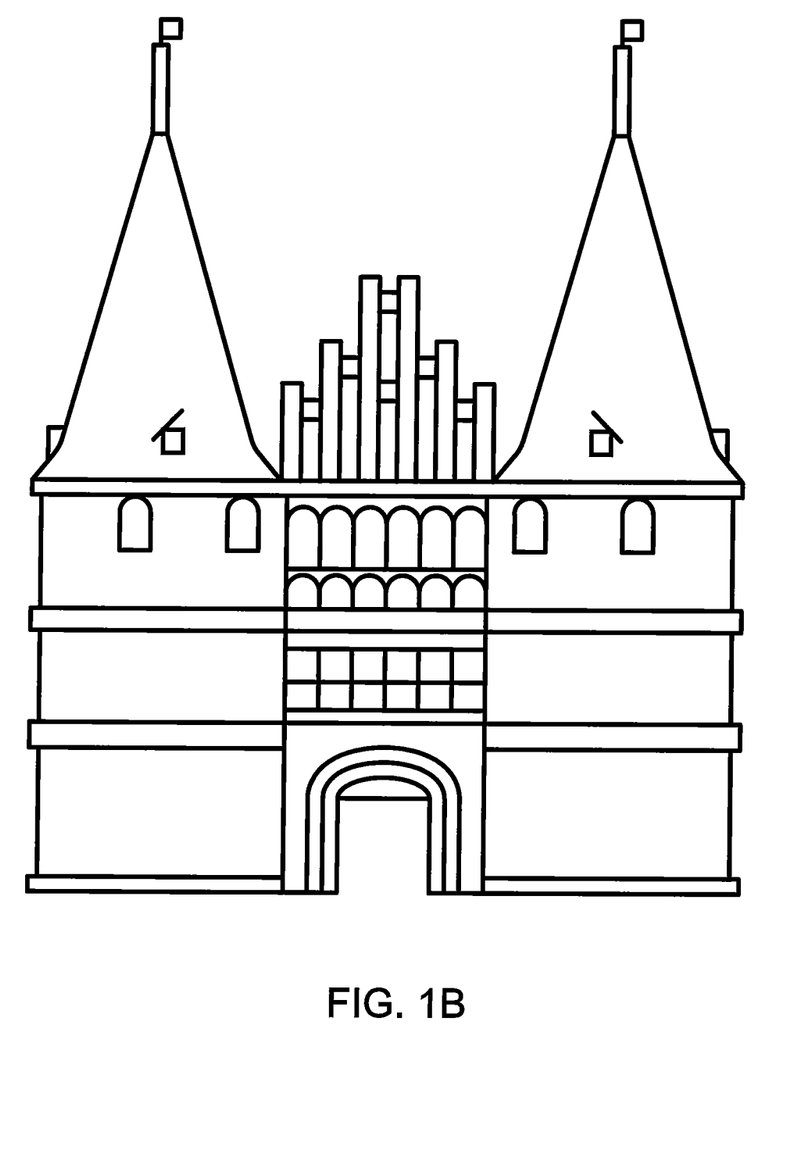

FIG. 1A representatively illustrates a vector graphic, for example, obtained from a digital picture of a landmark recorded with a video camera. Based on the recorded images of buildings, or the like, 3-dimensional models can be synthesized as vector graphics. Preferably, such synthesized models have data formats and algorithms that are adapted to the limited computer resources of vehicle navigation systems. Since vector graphics are based on mathematical functions, they can be calculated from relatively few data points that have to be stored. Data of each vector graphic has to be stored in a vector database only once. However, even if vector graphics rather than conventional bitmaps are used, still the demand for computational resources is relatively high. Thus, if the resulting loss of information is considered acceptable two-dimensional graphical objects (icons) rather than three-dimensional graphical objects may be displayed in a digital map. An example for an icon corresponding to the vector graphic is shown in FIG. 1B.

In one example, an icon may be provided in the PNG (portable network graphics) format. In other examples, other storage formats such as GIF (graphics interchange format) and TIFF (tagged image file format) formats may be employed. For image editing, PNG provides a useful format for the storage of intermediate stages of editing. Compression in the PNG format is fully lossless. PNG supports up to 48-bit true color or 16-bit grayscale and, thus saving, restoring and re-saving an image will not degrade its quality, unlike, for example, the JPEG (Joint Photographic Experts Group) format. Like GIF and TIFF, PNG is a raster format and represents an image as a two-dimensional array of colored dots or pixels.

PNG supports three main image types: true color, grayscale and palette-based. PNG supports three main types of integrity-checking to help avoid problems with file transfers and the like. The first and simplest is the eight-byte magic signature at the beginning of every PNG image. The second type of integrity-checking is known as a 32-bit cyclic redundancy check. The third type of integrity check applies only to the image-data chunks and is similar to the cyclic redundancy check, in principle.

Figure 2:
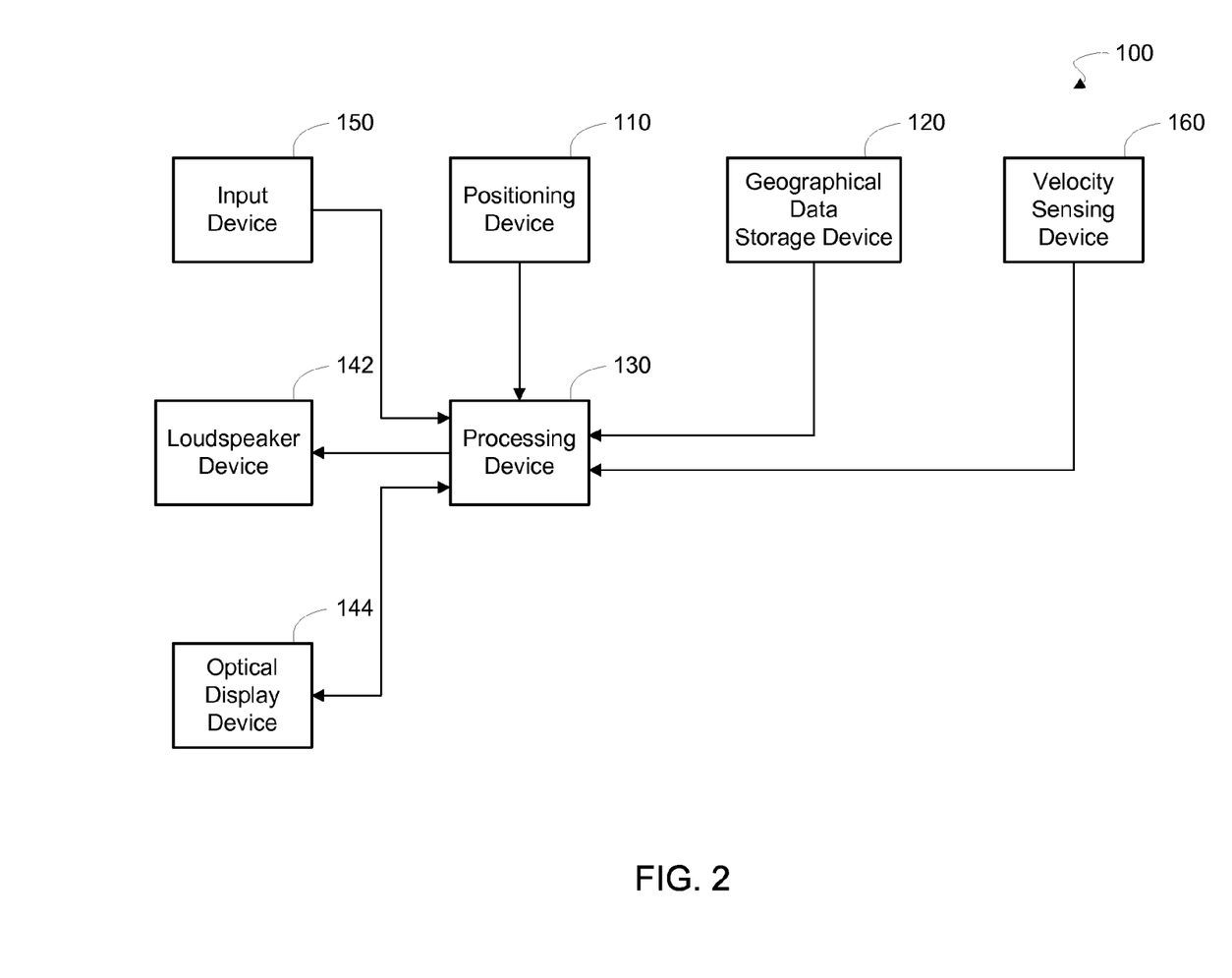
FIG. 2 illustrates a block diagram of one example of a navigation system for use in a vehicle.

FIG. 2 is a block diagram of an example navigation system 100 configured for use in a vehicle, such as an automobile, a boat, an airplane, or any other passenger carrying conveyance. The navigation system 100 may include and/or be interfaced to various devices and/or systems. The navigation system 100 may include a positioning device 110 which may determine the position of the vehicle in which the navigation system 100 may be installed or operated. For example, the positioning device 110 may include a GPS (global positioning system) receiver or a comparable satellite positioning system receiver for receiving positioning signals from navigation satellites. In other examples, the positioning device may be any other form of mobile positioning system, such as a beacon system, an angle of arrival system, a time of arrival system, or any combination thereof. A digital map representation, as well as operating instructions and any other data or instructions related to the navigation system 100 may be stored in a geographical data storage device 120 and/or any other memory or memory device. The geographical data storage device 120 may include, for example, one or more of a hard disk device, a CD-ROM device, a DVD device, a ROM memory device, or any other one or more non-transitory data storage devices. In addition, rewritable non-volatile memory, such as flash memory, may be provided to store date and information in a flexible way and/or to maintain the stored information even in the case of a power outage.

The navigation system 100 may include a processing device 130 for performing operational aspects of the navigation system 100, such as providing navigation information (i.e., visual and/or audio output) to the vehicle user (e.g., the driver). The processing device 130 may be configured to include a general processor, a digital signal processor, application specific integrated circuit, field programmable gate array, analog circuit, digital circuit, server processor, combinations thereof, or other now known or later developed processor. The processing device 130 may be configured as a single device or combination of devices, such as associated with a network or distributed processing. Any of various processing strategies may be used, such as multi-processing, multi-tasking, parallel processing, remote processing, centralized processing or the like. The processing device 130 may be responsive to or operable to execute instructions stored as part of software, hardware, integrated circuits, firmware, micro-code, or the like.

The processing device 130 may receive position data from the positioning device 110 and digital map data from the geographical data storage device 120 to determine a current position of the navigation system 100 with respect to the digital map representation. The processing device 130 may generate navigation information on the basis of the current position and/or other received data such as, for example, a destination entered by an occupant of the vehicle. The navigation information may include map data of the area surrounding the current location of the vehicle.

In addition, the navigation information may include navigation instructions such as, for example, indications of which action should be taken to navigate the vehicle on a preselected navigation route (e.g., "turn left", "turn right", or "follow the course of the road"). The navigation information also may include warnings relating to the navigation route. The warnings may include, for example, warnings relating to abnormal road conditions, speed limits, or other conditions.

The navigation system 100 may include various output devices to present or annunciate the navigation information to the driver. The output devices may include a loudspeaker device 142 and/or an optical display device 144. The loudspeaker device 142 may be a dedicated component of the navigation system 100. Alternatively, the loudspeaker device 142 may be a component of a vehicle entertainment system, such as a car radio, CD player, MP3 player, tape player, or a combination of such devices. If the navigation system 100 shares use of the loudspeaker device 142 with a vehicle entertainment system, the navigation system 100 may include an interface to permit transmission of the output signals corresponding to navigation information to the vehicle entertainment signal. This may be accomplished via a communication link such as a digital data bus in the vehicle. The optical display device 144 may be a full graphic display, such as, for example, a liquid-crystal display, a thin-film transistor display, or a cathode-ray tube display. The optical display device 144 also may be a projection display, such as a head-up display in which optical information may be projected onto a windscreen, or other surface of the vehicle. The optical display device 144 also may be combined with one or more input devices. For example, the optical display device 144 may be configured as a touchscreen device. The optical display device 144 may be a dedicated component of the navigation system 100 or may be used together with other vehicle systems, such as, for example, a multi-media system.

The processing device 130 may receive data from various other devices. The processing device 130 may be coupled to the positioning device 110 to receive a position data signal, to the geographical data storage device 120 to receive digital map data, to the loudspeaker device 142 to provide an acoustical output data signal, and/or to the optical display device 144 to provide an optical output data signal. The processing device 130 may evaluate position data received from the positioning device 110 via the position data signal and digital map data received from the geographical data storage device 120 to generate navigation information to be output to the vehicle user. The output navigation information may be a corresponding acoustical output signal and/or optical output signal.

Figure 3:
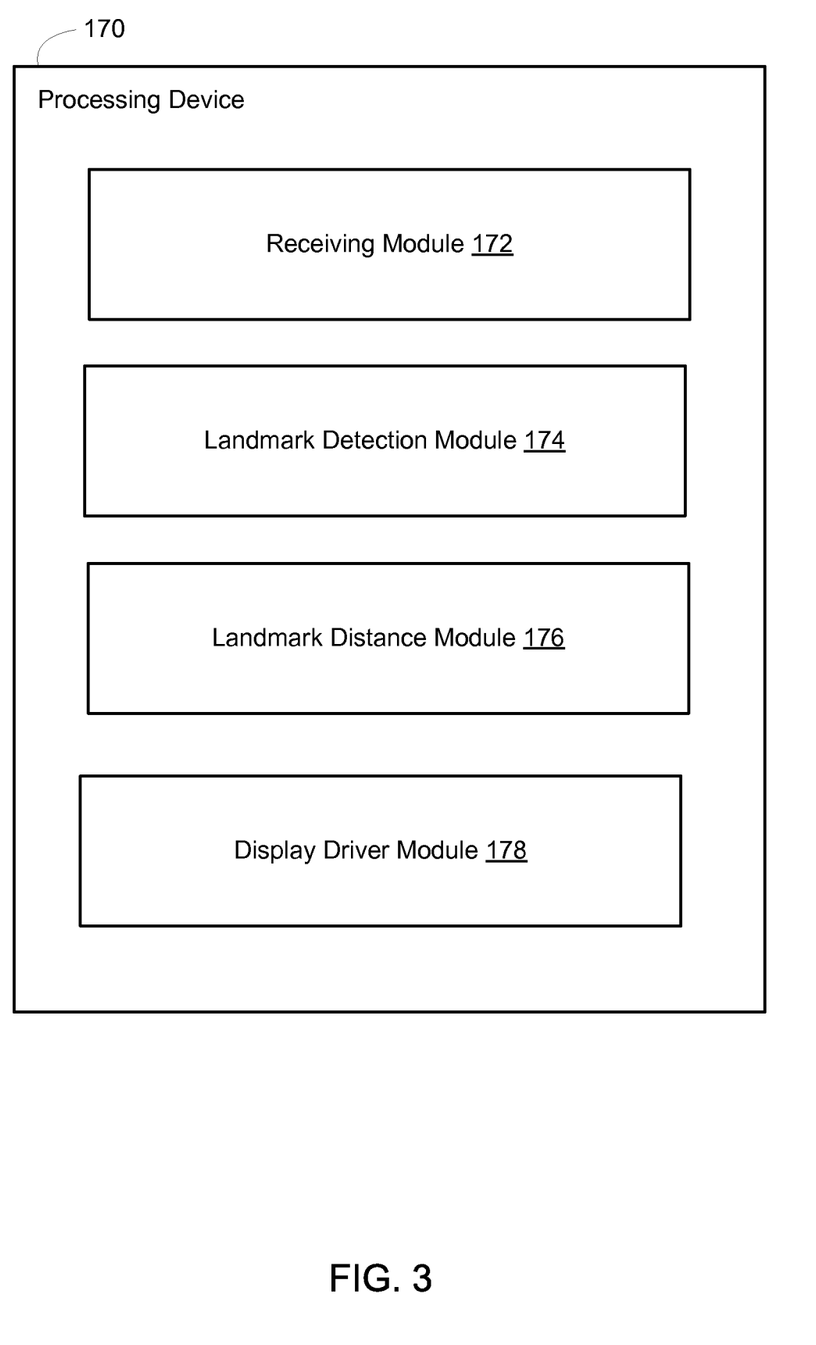
FIG. 3 illustrates a block diagram of one example of a processing device.

For example, as shown in FIG. 3, the processing device 130 may execute a receiving module 172 configured to receive position data from the positioning device 110, digital map data from the geographical data storage device 120, and/or velocity data from the velocity sensing device 160. The processing device 130 may have a landmark detection module 174 configured to determine a landmark based on the received data. The processing device 130 may have a landmark distance module 176 configured to calculate a distance between the current location of the navigation system 100 and the determined landmark. The processing device 130 may also have a display driver module 178 configured to present an appropriate output based on the analysis as further described later. The term "module" may be defined to include one or more executable modules. As described herein, the modules are defined to include software, hardware or some combination thereof executable by the processing device 130. Software modules may include instructions stored in the geographical data storage device 120, or any other memory device, that are executable by the processing device 130 or any other processor. Hardware modules may include various devices, components, circuits, gates, circuit boards, and the like that are executable, directed, and/or controlled for performance by the processing device 130.

The navigation system 100 also may include an input device 150. The processing device 130 may be coupled to the input device 150 to provide the vehicle user with control over functions of the processing device 130. The input device 150 may include suitably designed switches, buttons, a microphone for voice commands, a keyboard, and/or any other mechanism or technique for inputting information to the navigation system 100. The input device 150 may be used, for example, to activate or deactivate the navigation system, to select the navigation route, and/or to select between different navigation system output modes. The navigation system 100 output modes may include, for example, a mode providing for acoustic output of navigation information only, a mode providing for optical output of navigation information only, a mode providing for both acoustical and optical output of navigation information, or other suitable modes.

The navigation system 100 may include and/or be interfaced to a velocity sensing device 160 to detect a current velocity of the vehicle. The velocity sensing device 160 may include motion sensors, such as Anti-Lock Braking System (ABS) wheel sensors. These sensors may be positioned in proximity to each individual wheel or within a differential of the vehicle. The processing device 130 may be coupled to the velocity sensing device 160 to receive a velocity data signal. Alternatively, or additionally, the processing device 130 may be configured to calculate the velocity of the vehicle using the position data received from the positioning device 110. The processing device 130 may calculate the velocity by analyzing the change in the position of the vehicle over a period of time.

Figure 4:
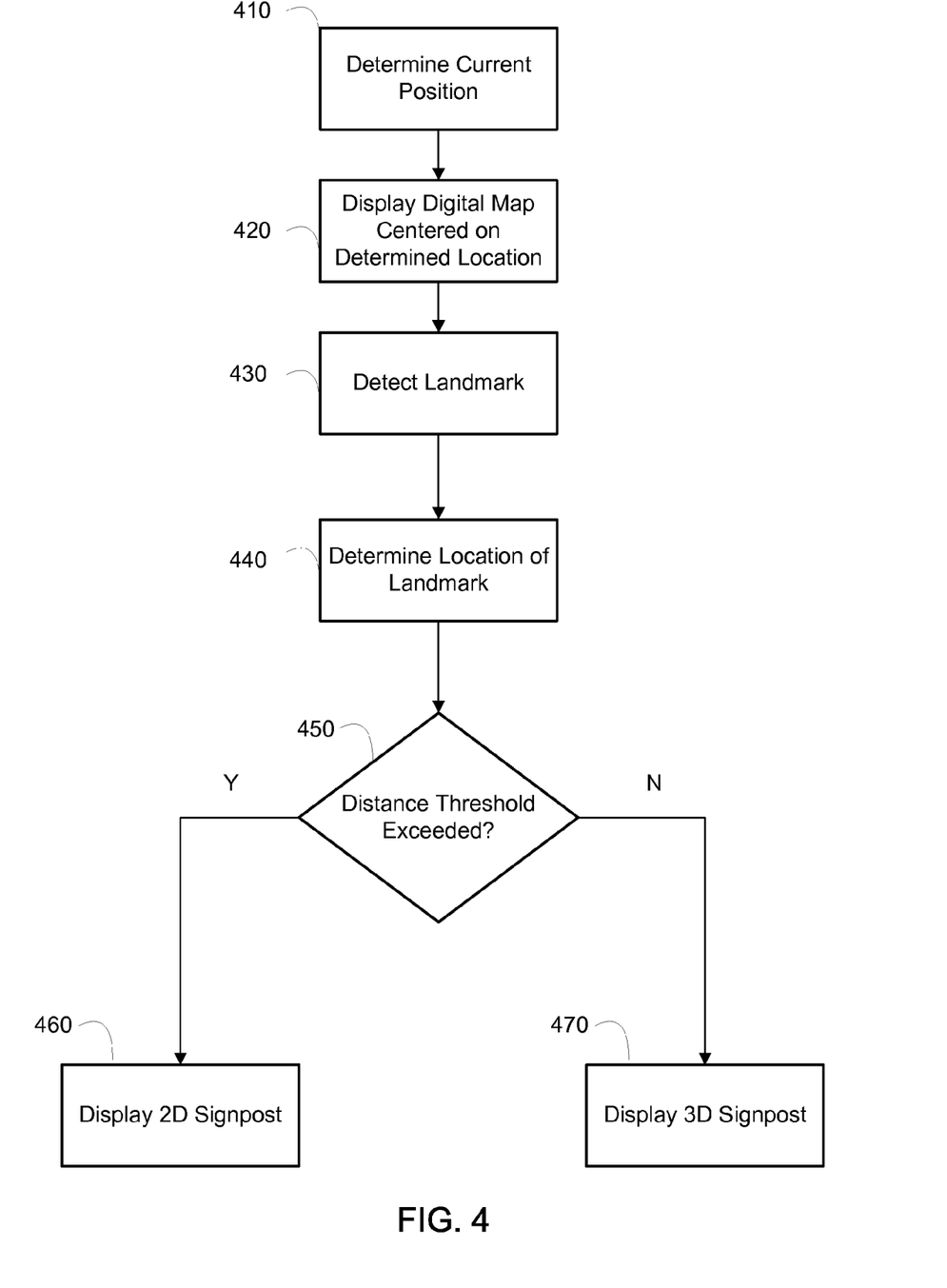
FIG. 4 illustrates a flow diagram of one example method according to an example of the present invention.

FIG. 4 is an example of an operational flowchart of the navigation system 100. The current position of a navigation system 100 with respect to a digital map representation may be determined by the navigation system 100 (at step 410). Consider a case wherein a vehicle is on its route recommended by the navigation system 100. The navigation system 100 continuously determines the position of the vehicle by taking into account data received by positioning device 110. A map matching algorithm allows for a substantially precise location of the vehicle in the digital map provided by geographical data storage device 120. Based on the information about the actual position of the vehicle and the driving direction according to the recommended route, the geographical section that can be viewed of the occupants of the vehicle can be calculated. A digital map centered on the current location of the navigation system 100 may be displayed to the occupants of the vehicle (at step 420) via optical display device 144.

Using a map matching algorithm and the digital map provided by the geographical data storage device 120, the landmark detection module 174 may determine whether a landmark is in the forward path of the vehicle according to the predetermined route (at step 430). If no landmark is detected, the navigation system 100 may continue determining the actual position of the vehicle and displaying a digital map centered on the determined location of the vehicle.

If a landmark is detected, the landmark distance module 176 may determine the location of the landmark and calculate the distance between the current location of the navigation system 100 and the location of the landmark (at step 440). The calculated distance may be compared against a predetermined distance threshold (at step 450). For example, in an urban area the threshold may be set to a distance of 25 yards, whereas in a rural area the threshold may be set to a distance of 250 yards. In another example, the distance threshold may be set based on landmark attribute (e.g., height of the landmark). In some examples, a user may be able to modify the distance threshold value.

If the predetermined distance threshold is exceeded it may not be necessary to provide the user of the navigation system 100 with full three-dimensional information of the landmark but rather a two-dimensional icon may be displayed in the digital map (at step 460). If, on the other hand, the threshold is not exceeded, it may be considered worthwhile providing the occupants of the vehicle with the full three-dimensional information of the landmark and, accordingly, a three-dimensional graphical object may be loaded from a database and displayed in the digital map at the appropriate location in the map. Thus, the computational load of the navigation system may be controlled in accordance with the location of the landmark that may be represented in the digital map (at step 470). Digital map computational resources such as memory resources are saved and computational time are reduced since a landmark of interest is represented by an icon when a full three-dimensional representation of the same would be of limited use to the occupants of the vehicle due to the distance of the landmark. In one example, a user may be able to manually control whether the three-dimensional graphical object or the two-dimensional icon is displayed for one or more landmarks.

Besides the mere distance, alternatively or additionally, the location of the landmark to be represented in the digital map with respect to the location of other landmarks in the surrounding area may be taken into account. For example, it may be determined whether or not another landmark lies within a direction or angle of view from the location of the vehicle such that this other landmark partly, mostly or completely hides, screens, or visually blocks the landmark to be represented in the digital map. If there is some level of visual obstruction of a landmark above a predetermined level, such as a percentage of overlap in visual display of landmarks on the display, the icon may be displayed rather than the three-dimensional graphical object representing the landmark.

For example, the landmark detection module 174 may be configured to determine whether the landmark to be represented in the digital map is partially or completely hidden (for example, more than fifty percent hidden) by another landmark. In this case, the display driver module 178 may be configured to display a two-dimensional graphical object representing the landmark if it is determined that the landmark to be represented in the digital map is (partly) hidden by another landmark.

The determination of whether another landmark lies within a direction or angle of view from the location of the navigation system 100 such that the landmark that is to be represented in the digital map is partially or completely hidden from the driver can be made on the basis of information provided by three-dimensional map data comprising, for example, information on the heights and widths of landmarks, or other objects, such as buildings or hills. For example, the digital map can be a three-dimensional map. For example, the digital map may be a three-dimensional digital map generated based on a digital terrain model. A terrain model is a three-dimensional model of a landscape obtained by laser-scanning or other means. A great variety of topographic terrain models are provided by official institutions as well as commercial providers. In principle, a digital terrain model is a digital file consisting of terrain elevations for ground positions at regularly or irregularly spaced horizontal intervals. The term "terrain" as used herein shall also comprise the three-dimensional topography of an urban area, such as a city, village, or the like. The raster points included in the terrain model have three-dimensional coordinate values.

The positioning of the displayed two-dimensional icon or three-dimensional graphical object may also be an important issue. Thus, it may be desirable to determine a portion of a map element where a two-dimensional icon or three-dimensional graphical object may be displayed where no overlap with the two-dimensional icon or three-dimensional graphical object shall occur or to determine a portion in the vicinity of the map element in the digital map where no overlap with the two-dimensional icon or three-dimensional graphical object shall occur. Then, the two-dimensional icon or three-dimensional graphical object may be positioned in the digital map such that the portion of the map element where no overlap with the two-dimensional icon or three-dimensional graphical object shall occur and/or the portion in the vicinity of the map element in the digital map where no overlap with the two-dimensional icon or three-dimensional graphical object shall occur is not either partially or completely covered by the two-dimensional icon or three-dimensional graphical object.

The map element, in this context, is a graphical element of the map representing a landmark. For example, the map element may include, but is not limited to, a building, a bridge, a statue, a road, a mountain, a river, a lake, or the like. In some examples, the two-dimensional icon or three-dimensional graphical object may be display such that no overlap occurs with a map element, thereby hiding a portion of the map element.

Thus, for example, an intersection in two-dimensional or three-dimensional view can be displayed in a manner that allows that all relevant parts can be completely seen by a user.

The portion of the map element where no, or only a predetermined amount of overlap with the two-dimensional icon or three-dimensional graphical object shall occur and/or the portion in the vicinity of the map element in the digital map where no, or only a predetermined amount of overlap with the two-dimensional icon or three-dimensional graphical object shall occur can be determined based on coordinates provided for the digital map. Thereby, substantially exact positioning of the two-dimensional icon is made possible. Thus, it is possible to determine coordinate values of a point of the map element and the portion of the map element where no, or only a predetermined amount of overlap with the two-dimensional icon or three-dimensional graphical object shall occur and/or the portion in the vicinity of the map element in the digital map where no, or only a predetermined amount of overlap with the two-dimensional icon or three-dimensional graphical object shall occur can be determined based on the determined coordinate values. The coordinate values can be stored in a database of the navigation system 100.

In one example, a portion of the map element in the digital map where no overlap with the two-dimensional icon or three-dimensional graphical object shall occur and/or a portion of the map element in the vicinity of the map element where no overlap with the two-dimensional icon or three-dimensional graphical object shall occur can, particularly, be determined by a radius defined about the coordinates with the determined coordinate values. For example, a radius may be determined about a coordinate of a central point of the map element. Information on the coordinate values of such coordinates may also be stored in the database of the navigation system 100.

The navigation system 100 may display detailed three-dimensional animated intersection views. For example, when a vehicle that includes the navigation system 100 approaches an intersection, a representation of the respective intersection may be provided by an intersection view database containing references to the animation database storing animated data. The animated data consists of data units that may consist of bitmaps and/or vector graphics and/or metafiles (i.e., combined bitmaps and vector graphics).

The animation data may consist of a temporal sequence of individual static images. The speed at which the animation takes place may depend on the location and speed of the vehicle. The animation data may show perspective views of the approached intersection. In one example, the animation data may include a number of lanes, slopes, branches, crossroads, and the like. Alternatively or in addition, the animation data may comprise topographical objects as bridges, administrative buildings, signposts, environmental views representing an urban, rural or industrial environment and/or a mountain landscape.

In one example, the processing device 170 may include an intersection view calculation module. The intersection view calculation module of the navigation system 100 may access the animation database to obtain relevant animated intersection view data. Alternatively, the intersection view calculation module may produce animated data from standard images provided by an animation database and/or an intersection view database and/or a map database.

The animated data may be available in a predetermined format or protocol, such as the Audio Video Interleave Format (AVI). In this case, the AVI data may be provided to an AVI player included in the navigation system 100. The animation may start and end at pre-defined respective positions of the navigation system ahead of and after the intersection. The AVI player may be synchronized with data provided by a location system determining the actual position of the vehicle in which the navigation system is included. Thus, the elapsed time may be synchronized with the driven distance, and the synthesized animated intersection view may be displayed on the display device of the navigation system 100 synchronously to the actual position of the vehicle. The two-dimensional and three-dimensional graphical objects may represent elements of an animated intersection view or may be used to supplement an animated intersection view.

The navigation system 100 need not be related to an automobile but can be used with any type of platform including, but not limited to, a ship, a boat, an aircraft, a pedestrian, a cyclist, or a hiker.

The foregoing description of implementations has been presented for purposes of illustration and description. It is not exhaustive and does not limit the claimed inventions to the precise form disclosed. Modifications and variations are possible in light of the above description or may be acquired from practicing the invention. For example, one or more processes, sub-processes, or process steps described in connection with FIG. 4 may be performed by hardware and/or software. Additionally, the navigation system 100, as described above, may be implemented in software that would be executed within a processor or plurality of processor in a networked environment. Examples of a processor include but are not limited to microprocessor, general purpose processor, combination of processors, DSP, any logic or decision processing unit regardless of method of operation, instructions execution/system/apparatus/device and/or ASIC. If the process is performed by software, the software may reside in software memory (not shown) in the device used to execute the software. The software in software memory may include an ordered listing of executable instructions for implementing logical functions, i.e., "logic" that may be implemented either in digital form such as digital circuitry or source code or optical circuitry or chemical or biochemical in analog form such as analog circuitry or an analog source such an analog electrical, sound or video signal, and may selectively be embodied in any signal-bearing (such as a machine-readable and/or computer-readable) medium for use, by or in connection with an instruction execution system, apparatus, or device, such as a computer-based system, processor-containing system, or other system that may selectively fetch the instructions from the instruction execution system, apparatus, or device and execute the instructions. In the context of this document, a "machine-readable medium," "computer-readable medium," and/or "signal-bearing medium" (hereinafter, "signal-bearing medium") is any means that may contain, store, communicate, propagate, or transport the program for use by or in connection with the instruction execution system, apparatus, or device. The signal-bearing medium may selectively be, for example but not limited to, an electronic, magnetic, optical, electromagnetic, infrared, or semiconductor system, apparatus, device, air, water, or propagation medium. More specific examples, but nonetheless a non-exhaustive list, of to computer-readable media would include the following: an electrical connection (electronic) having one or more wires; a portable computer diskette (magnetic); a RAM (electronic); a read-only memory "ROM" (electronic); an erasable programmable read-only memory (EPROM or Flash memory) (electronic); an optical fiber (optical); and a portable compact disc read-only memory "CDROM" "DVD" (optical). Note that the computer-readable medium may even be paper or another suitable medium upon which the program is printed, as the program can be electronically captured, via, for instance, optical scanning of the paper or other medium, then compiled, interpreted or otherwise processed in a suitable manner if necessary, and then stored in a computer memory. Additionally, it is appreciated that a signal-bearing medium may include carrier wave signals on propagated signals in telecommunication and/or network distributed systems. These propagated signals may be computer, i.e., machine data signals embodied in the carrier wave signal. The computer/machine data signals may include data or software that is transported or interacts with the carrier wave signal. Note also that the implementation may vary between systems. Accordingly, the invention is not to be restricted except in light of the attached claims and their equivalents.

We claim:

1. A method for graphically representing a physical object in a digital map comprising:
    displaying at least a part of the digital map;
    determining a distance of a graphical representation of the physical object from a center of the displayed at least a part of the map;
    displaying a first graphical representation of the physical object when the distance exceeds a predetermined threshold, the first graphical representation comprising a two-dimensional graphical object; and
    displaying a second graphical representation of the physical object when the distance does not exceed the predetermined threshold, the second graphical representation comprising a three-dimensional graphical object.

2. The method of claim 1, wherein the physical object comprises a landmark.

3. The method of claim 1, wherein at least one of the two-dimensional graphical object or the three-dimensional graphical object comprises at least one of a vector graphic object or a bitmap object.

4. The method of claim 1, wherein the digital map comprises a three-dimensional map.

5. The method of claim 1, further comprising changing the two-dimensional graphical object to the three-dimensional graphical object in response to the distance changing from exceeding the predetermined threshold to not exceeding the predetermined threshold.

6. The method of claim 1, further comprising changing the three-dimensional graphical object to the two-dimensional graphical object in response to the distance changing from not exceeding the predetermined threshold to exceeding the predetermined threshold.

7. The method of claim 1, further comprising:
displaying a map element;
determining the position of the map element in the at least a part of the digital map; and
displaying the at least one of the two-dimensional graphical object or the three-dimensional graphical object such that no overlap occurs with the map element.

8. A navigation system, comprising:
a processing device configured to execute the plurality of modules;
a display driver module executable to display at least a part of a digital map;
a landmark detection module executable to detect a physical object;
a landmark distance module executable to determine a distance of the physical object from a location of the navigation system;
the display driver module further executable to display a first graphical representation of the physical object when the distance exceeds a predetermined threshold, wherein the predetermined threshold is based on an attribute of the physical object and the attribute is independent of a location of the physical object relative to the location of the navigation system, the first graphical representation comprising a two-dimensional graphical object; and
the display driver module further executable to display a second graphical representation of the physical object when the distance does not exceed the predetermined threshold, the second graphical representation comprising a three-dimensional graphical object.

9. The navigation system of claim 8, further comprising a navigation database comprising digital map data, the digital map data comprising the three-dimensional graphical object representing the physical object, the two-dimensional graphical object representing the physical object, the attribute of the physical object, and animated data.

10. The navigation system of claim 8, wherein the display driver module is further executable to change the two-dimensional graphical object to the three-dimensional graphical object in response to the distance changing from exceeding the predetermined threshold to not exceeding the predetermined threshold.

11. The navigation system of claim 8, wherein the display driver module is further executable to change the three-dimensional graphical object to the two-dimensional graphical object in response to the distance changing from not exceeding the predetermined threshold to exceeding the predetermined threshold.

12. The navigation system of claim 8, wherein the physical object comprises a landmark.

13. The navigation system of claim 8, further comprising an intersection view calculation module executable to generate an animated intersection view and the display driver module further executable to display the animated intersection view.

14. The navigation system of claim 8, wherein the attribute of the physical object is at least one of a height of the physical object, or a type of geographic area of the location of the physical object.

15. A non-transitory tangible computer-readable medium comprising a plurality of instructions for execution with a processor, the computer-readable medium comprising:
instructions executable to display at least a part of a digital map;
instructions executable to detect a first physical object and a second physical object;
instructions executable to determine a graphical representation type of the first physical object based on:
a location of the first physical object,
a location of the second physical object, and
a location of a navigation system; and
instructions executable to display a graphical representation of the first physical object based on the determined graphical representation type, and the graphical representation comprising one of a two-dimensional graphical object or a three-dimensional graphical object.

16. The non-transitory computer-readable medium of claim 15, further comprising instructions to change the two-dimensional graphical object to the three-dimensional graphical object in response to a change in the graphical representation type of the first physical object caused by a change in the location of the navigation system.

17. The non-transitory computer-readable medium of claim 15, further comprising instructions to change the three-dimensional graphical object to the two-dimensional graphical object in response to a change in the graphical representation type of the first physical object caused by a change in the location of the navigation system.

18. The non-transitory computer-readable medium of claim 15, wherein the first physical object comprises a landmark.

19. The non-transitory computer-readable medium of claim 15, further comprising instructions executable to generate an animated intersection view and instructions executable to display the animated intersection view.

20. The non-transitory computer-readable medium of claim 15, wherein the graphical representation type is determined based on a distance of the first physical object from the navigation system, a distance of the second physical object from the navigation system, an angle of view of the first physical object from the navigation system, and an angle of view of the second physical object from the navigation system.

21. The non-transitory computer-readable medium of claim 15, wherein the instructions executable to determine a graphical representation type of the first physical object also determines the graphical representation type of the first physical object based on whether the first physical object is partially or completely hidden from view by the second physical object.

* * * * *